US012090767B2

(12) United States Patent
Gim et al.

(10) Patent No.: US 12,090,767 B2
(45) Date of Patent: Sep. 17, 2024

(54) DEFECTIVE NOZZLE LOCATING MECHANISM

(71) Applicants: Jiwon Gim, Boulder, CO (US); Scott R. Johnson, Boulder, CO (US); Ziling Zhang, Boulder, CO (US); Mikel Stanich, Boulder, CO (US)

(72) Inventors: Jiwon Gim, Boulder, CO (US); Scott R. Johnson, Boulder, CO (US); Ziling Zhang, Boulder, CO (US); Mikel Stanich, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 169 days.

(21) Appl. No.: 17/956,181

(22) Filed: Sep. 29, 2022

(65) Prior Publication Data

US 2024/0109334 A1 Apr. 4, 2024

(51) Int. Cl.
*B41J 2/21* (2006.01)
*B41J 2/045* (2006.01)

(52) U.S. Cl.
CPC ........... *B41J 2/2142* (2013.01); *B41J 2/0451* (2013.01)

(58) Field of Classification Search
CPC .............................. B41J 2/2142; B41J 2/0451
See application file for complete search history.

(56) References Cited

U.S. PATENT DOCUMENTS 7,287,824 B2 10/2007 Subirada et al.
7,374,270 B2 5/2008 Kojima
8,126,199 B2 2/2012 Wu et al.
8,157,345 B2 4/2012 Sasayama
8,376,503 B1 2/2013 Wu et al.
8,562,099 B2 10/2013 Kido
8,602,518 B2 12/2013 Mizes et al.
8,702,194 B2 4/2014 Kido
8,807,684 B2 8/2014 Allworth et al.
(Continued)

FOREIGN PATENT DOCUMENTS

CN 113320286 A * 8/2021 ................ B41J 2/07
DE 102018204312 B3 * 2/2019 ............. B41J 2/165
(Continued)

OTHER PUBLICATIONS

Vantram et al., Fully Automated Calibration Procedure to Compensate Print Non-Uniformities Incurred in Fixed Print-Head Array Structures, Ricoh Technical Report No. 39, Jan. 2014, 7 pages.
(Continued)

*Primary Examiner* — Sharon Polk
(74) *Attorney, Agent, or Firm* — Jaffery Watson Hamilton & DeSanctis LLP

(57) ABSTRACT

A printing system is disclosed. The printing system includes at least one physical memory device to store defective print element determination logic and one or more processors coupled with the at least one physical memory device to execute the defective print element determination logic to receive a print image comprising evaluation marks and locator marks applied to a print medium by a plurality of pel forming elements according to print instructions and identify pel forming elements associated with print defect pels in the print image among the plurality of pel forming elements based on the evaluation marks, the locator marks and the print instructions.

20 Claims, 20 Drawing Sheets

(56) References Cited

U.S. PATENT DOCUMENTS

| | | | | |
|---|---|---|---|---|
| 8,807,691 | B2 | 8/2014 | Chandu et al. | |
| 8,814,316 | B2 | 8/2014 | Kido | |
| 8,845,060 | B2 | 9/2014 | Azuma et al. | |
| 8,985,733 | B2 | 3/2015 | Terada | |
| 9,505,252 | B2 | 11/2016 | Aoi | |
| 9,681,006 | B2 | 6/2017 | Tanabe | |
| 9,707,785 | B2 | 7/2017 | Donaldson | |
| 9,718,292 | B2 | 8/2017 | Kimura | |
| 9,776,425 | B2 | 10/2017 | Kyoso | |
| 10,155,405 | B2 | 12/2018 | Kyoso | |
| 10,479,122 | B2 | 11/2019 | Kritchman et al. | |
| 10,576,751 | B2 | 3/2020 | Gazala | |
| 10,589,519 | B2 | 3/2020 | Muth et al. | |
| 10,603,923 | B2 | 3/2020 | Muehl et al. | |
| 10,800,193 | B2 | 10/2020 | Muramatsu et al. | |
| 10,953,662 | B2 | 3/2021 | Muramatsu | |
| 11,020,959 | B2 | 6/2021 | Murase et al. | |
| 11,059,289 | B1 | 7/2021 | Praharaj et al. | |
| 11,198,288 | B2 | 12/2021 | Fehlner et al. | |
| 2007/0040878 | A1* | 2/2007 | Ikefuji | B41J 2/2146 347/90 |
| 2011/0227988 | A1 | 9/2011 | Yamazaki | |
| 2019/0105895 | A1* | 4/2019 | Muehl | B41J 2/04586 |
| 2019/0168514 | A1 | 6/2019 | Gazala | |
| 2020/0361210 | A1 | 11/2020 | Sato et al. | |
| 2021/0183036 | A1 | 6/2021 | Gurudath et al. | |
| 2021/0402758 | A1 | 12/2021 | Ohara | |
| 2022/0219463 | A1 | 7/2022 | Steenkamer et al. | |
| 2022/0288946 | A1 | 9/2022 | Rotman et al. | |

FOREIGN PATENT DOCUMENTS

| | | | |
|---|---|---|---|
| JP | 5012182 | | 8/2012 |
| JP | 6049268 | | 9/2012 |
| JP | 5079422 | | 11/2012 |
| JP | 5240108 | | 7/2013 |
| JP | 5328965 | | 10/2013 |
| JP | 5361085 | B2 | 12/2013 |
| JP | 5473704 | | 4/2014 |
| JP | 5519405 | | 6/2014 |
| JP | 5623192 | | 11/2014 |
| JP | 5631448 | | 11/2014 |
| JP | 5713683 | | 5/2015 |
| JP | 5898591 | | 4/2016 |
| JP | 6062832 | | 9/2016 |
| JP | 6018994 | | 11/2016 |
| JP | 6138569 | | 5/2017 |
| JP | 6163705 | | 7/2017 |
| JP | 6216067 | | 10/2017 |
| JP | 6276586 | | 2/2018 |
| JP | 6309955 | | 4/2018 |
| JP | 6346787 | | 6/2018 |
| JP | 6433272 | | 12/2018 |
| JP | 6472083 | | 2/2019 |
| JP | 6544858 | | 7/2019 |
| JP | 6579113 | | 9/2019 |
| JP | 2020006688 | | 1/2020 |
| JP | 6708073 | | 6/2020 |
| JP | 2020114666 | | 7/2020 |
| JP | 6737101 | | 8/2020 |
| JP | 6870646 | | 5/2021 |
| JP | 6897992 | | 7/2021 |
| JP | 2021178461 | | 11/2021 |
| JP | 7008078 | | 1/2022 |
| JP | 2022011429 | | 1/2022 |
| JP | 7022296 | | 2/2022 |
| JP | 2022027605 | | 2/2022 |
| JP | 2022030543 | | 2/2022 |
| JP | 7079114 | | 6/2022 |
| JP | 7087487 | | 6/2022 |
| JP | 2022115165 | | 8/2022 |
| JP | 2022535358 | | 8/2022 |
| JP | 7172493 | | 11/2022 |
| JP | 7242350 | | 3/2023 |
| JP | 2020142503 | | 9/2023 |
| WO | 2021256389 | A1 | 12/2021 |

OTHER PUBLICATIONS

Overs et al., "Method of Identifying Defective Nozzles in an Inkjet Printhead", Semantic Scholar, Apr. 14, 2022, 2 pages.

* cited by examiner

| | 2 row | 4 row | 6+ row |
|---|---|---|---|
| Paper usage | low | medium | high |
| Ink usage for pattern height | high | medium | low |
| Applicable ink spread | low, medium | low, medium, high | medium, high |

Figure 5

Refining ROI when skews occurs- before and after refinement of row

Refining ROI when jet-out exists -- before and after refinement of row

DEFECTIVE NOZZLE LOCATING MECHANISM

FIELD OF THE INVENTION

The invention relates to the field of printing systems, and in particular, to detecting defective nozzles in a printing system.

BACKGROUND

Entities with substantial printing demands typically implement a high-speed production printer for volume printing (e.g., one hundred pages per minute or more). Production printers may include continuous-forms printers that print on a web of print media (or paper) stored on a large roll. A production printer typically includes a print controller that controls the overall operation of the printing system, and a print engine that includes one or more printhead assemblies, where each assembly includes a print head controller and a printhead (or array of printheads). Each print head comprises a plurality of nozzles for the ejection of ink or any colorant suitable for printing on a medium.

However, various nozzles may become defective during printer operation, which may lead to undesired changes in jetting output (e.g., ink deposition artifacts such as jet-outs or deviated jets) caused by the defective nozzles. To correct defective nozzles in real-time, print charts used for determining print defects and the associated defective nozzles need to be cost efficient in terms of ink and paper consumption. Current mechanisms for detecting defects at the nozzle level uses comb patterns, which require significant paper and ink usage. Additionally, removing large patterns or sacrificial pages that contain only the comb patterns from a print production workflow is time consuming and disruptive. Moreover, conventional mechanisms using compact or dense print patterns to detect print defects are not capable of locating the defective nozzles due to complicating factors such as paper shrinkage and ink spread on the paper.

Accordingly, a mechanism to perform defective nozzle locating is desired.

SUMMARY

In one embodiment, a printing system is disclosed. The printing system includes at least one physical memory device to store defective print element determination logic and one or more processors coupled with the at least one physical memory device to execute the defective print element determination logic to receive a print image comprising evaluation marks and locator marks applied to a print medium by a plurality of pel forming elements according to print instructions and identify pel forming elements associated with print defect pels in the print image among the plurality of pel forming elements based on the evaluation marks, the locator marks and the print instructions.

BRIEF DESCRIPTION OF THE DRAWINGS

A better understanding of the present invention can be obtained from the following detailed description in conjunction with the following drawings, in which:

FIG. 5 illustrates one embodiment of a table of flushline pattern designs;

DETAILED DESCRIPTION

A mechanism to perform defective nozzle locating is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
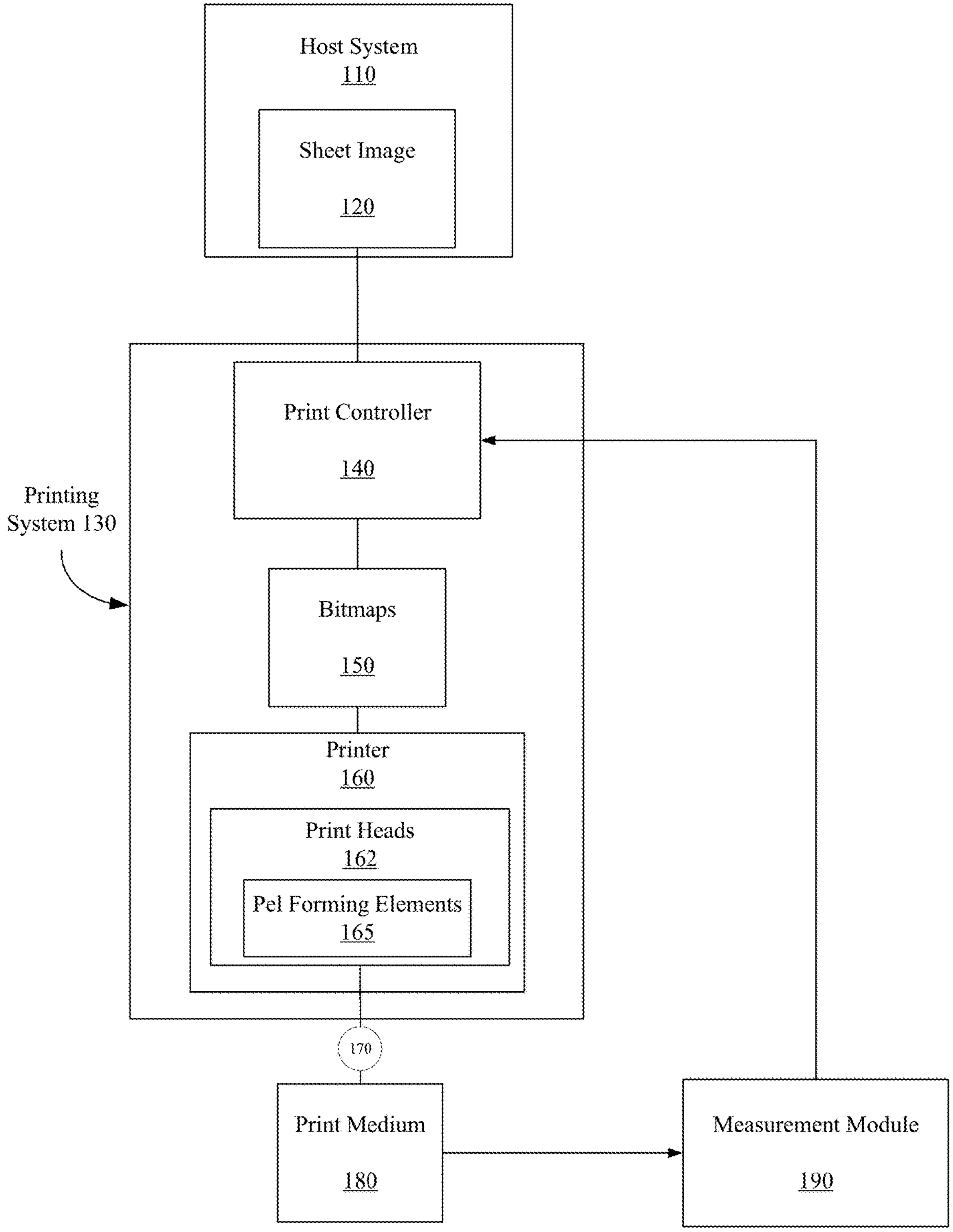
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 via a printer 160 (e.g., print engine). Print medium 180 may include paper, card stock, paper board, corrugated fiberboard, film, plastic, synthetic, textile, glass, composite or any other tangible medium suitable for printing. The format of print medium 180 may be continuous form or cut sheet or any other format suitable for printing. Printer 160 may be an ink jet, electrophotographic or another suitable printer type having a well-defined association with the amount of marking material deposited in each individual printer picture element (pel or pixel).

In one embodiment, printer 160 comprises one or more print heads 162, each including one or more pel forming elements 165 that directly or indirectly (e.g., by transfer of marking material through an intermediary) forms the representation pels on the print medium 180 with marking material (e.g., ink, paint, toner, polymers and other materials suitable for printing) applied (e.g., deposited) to the print medium. In an ink jet printer, the pel forming element 165 is a tangible device (e.g., an ink jet nozzle) that ejects the ink drop 170 (e.g., marking material elements) onto the print medium 180 and, in an electrophotographic (EP) printer the pel forming element may be a tangible device that determines the location of toner particles printed on the print medium (e.g., an EP exposure LED or an EP exposure laser).

The pel forming elements may be grouped together into one or more printheads. The pel forming elements 165 may be stationary (e.g., as part of a stationary printhead) or moving (e.g., as part of a printhead that moves across the print medium 180) as a matter of design choice. The pel forming elements 165 may be assigned to one of one or more color planes that correspond to types of marking materials (e.g., Cyan, Magenta, Yellow, and blacK (CMYK)).

In a further embodiment, printer 160 is a multi-pass printer (e.g., dual pass, 3 pass, 4 pass, etc.) wherein multiple sets of pel forming elements 165 print the same region of the print image on the print medium 180. The set of pel forming elements 165 may be located on the same physical structure (e.g., an array of nozzles on an ink jet print head) or separate physical structures. The resulting print medium 180 may be printed in color and/or in any of a number of gray shades, including black and white (e.g., Cyan, Magenta, Yellow, and blacK, (CMYK)). The host system 110 may include any computing device, such as a personal computer, a server, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for transmission. Bitmap 150 may be a halftoned bitmap (e.g., a calibrated halftone bitmap generated from calibrated halftones, or uncalibrated halftone bitmap generated from uncalibrated halftones) for printing to the print medium 180. The printing system 130 may be a high-speed printer operable to print relatively high volumes (e.g., greater than 100 pages per minute).

The print medium 180 may be continuous form paper, cut sheet paper, and/or any other tangible medium suitable for printing. The printing system 130, in one generalized form, includes the printer 160 that presents the bitmap 150 onto the print medium 180 (e.g., via toner, ink, etc.) based on the sheet image 120. Although shown as a component of printing system 130, other embodiments may feature printer 160 as an independent device communicably coupled to print controller 140. The print medium 180 is transported from the entrance to the exit of printer 160 in the web movement direction during printing. The cross web direction is perpendicular to the web movement direction and is across the print medium 180. In print systems mentioned above where a part of the printhead 162 moves across the print medium 180, the printhead 162 moves in the cross web direction.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities. In one embodiment, measurement module 190 is implemented as part of print quality (i.e., print defect detection and defective nozzle locating) systems to obtain measurements of the printed medium 180. The measured results are communicated to print controller 140 to be used to as a part of print quality systems. The measurement module 190 may be a stand-alone system communicably coupled to printing system 130 or be integrated into the printing system 130.

According to one embodiment, measurement module 190 may be a sensor to take measurements of printed images on print medium 180. Measurement module 190 may generate and transmit print image measurement data. Print image measurement data may be color response (e.g., spectral, RGB, optical density, etc.) data corresponding to a printed image that is either raw or processed. The intensity value at a pixel location in the print image measurement data corresponds to the color response at a corresponding pixel location on the print medium. In one embodiment, measurement module 190 may comprise one or more sensors that each or in total take measurements for printed markings produced for some or all pel forming elements 165.

In another embodiment, measurement module 190 may be a camera system, in-line scanner, densitometer or spectrophotometer. In a further embodiment, print image measurement data may include map information to correlate portions (e.g., a pel or plurality of pels) of the print image data to the corresponding pel forming elements 165 that produced the portions of the printed images.

Figure 2A:
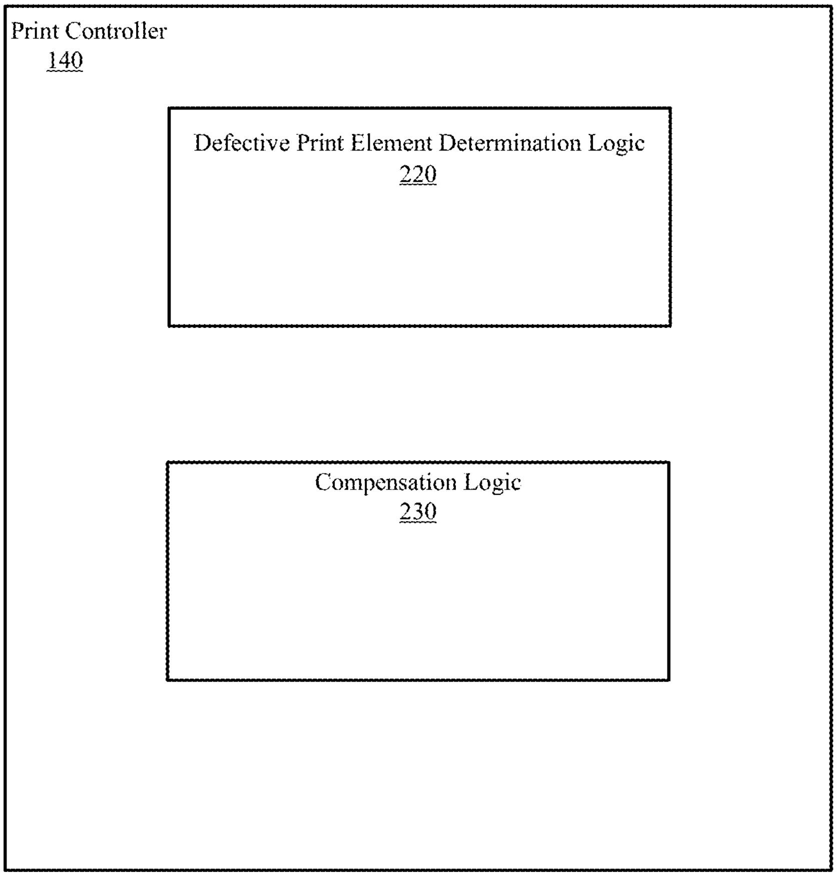
FIGS. 2A&2B illustrate block diagrams of embodiments of a print controller.
Figure 2B:
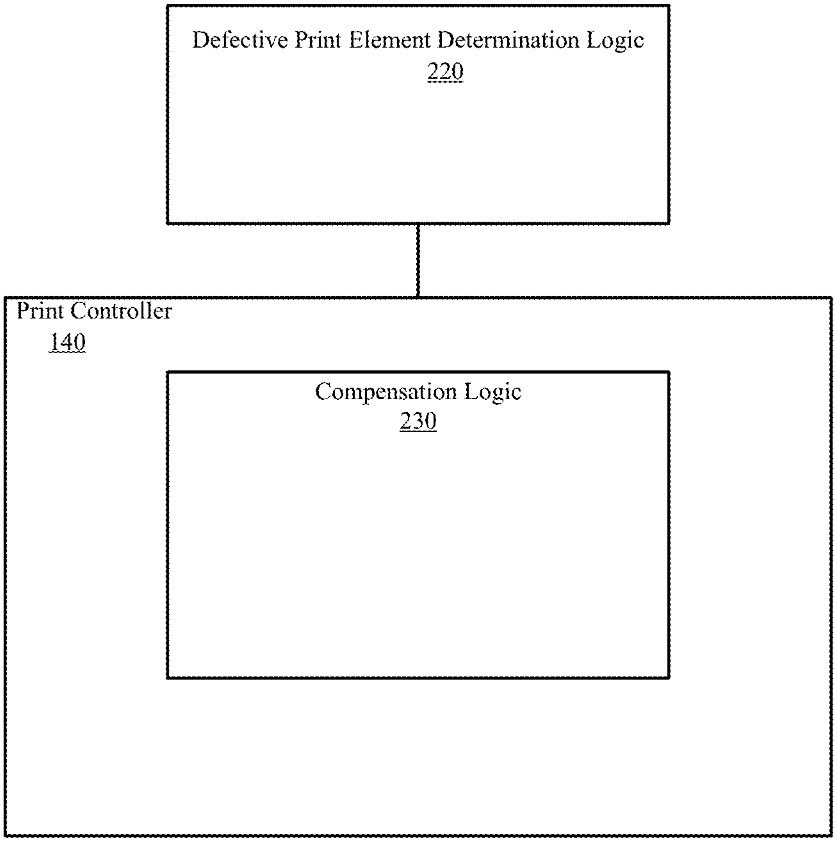

FIGS. 2A&2B illustrate embodiments implementing print controller 140. FIG. 2A illustrates a print controller 140 (e.g., DFE or digital front end), in its generalized form, including defective print element determination logic 220 and compensation logic 230. FIG. 2B illustrates an embodiment in which print controller 140 includes compensation logic 230, while defective print element determination logic 220 is coupled externally. In either embodiment, the separate components may represent hardware used to implement the print controller 140. Alternatively, or additionally, the separate components may represent logical blocks implemented by executing software instructions in a processor of the printer controller 140.

Figure 2C:
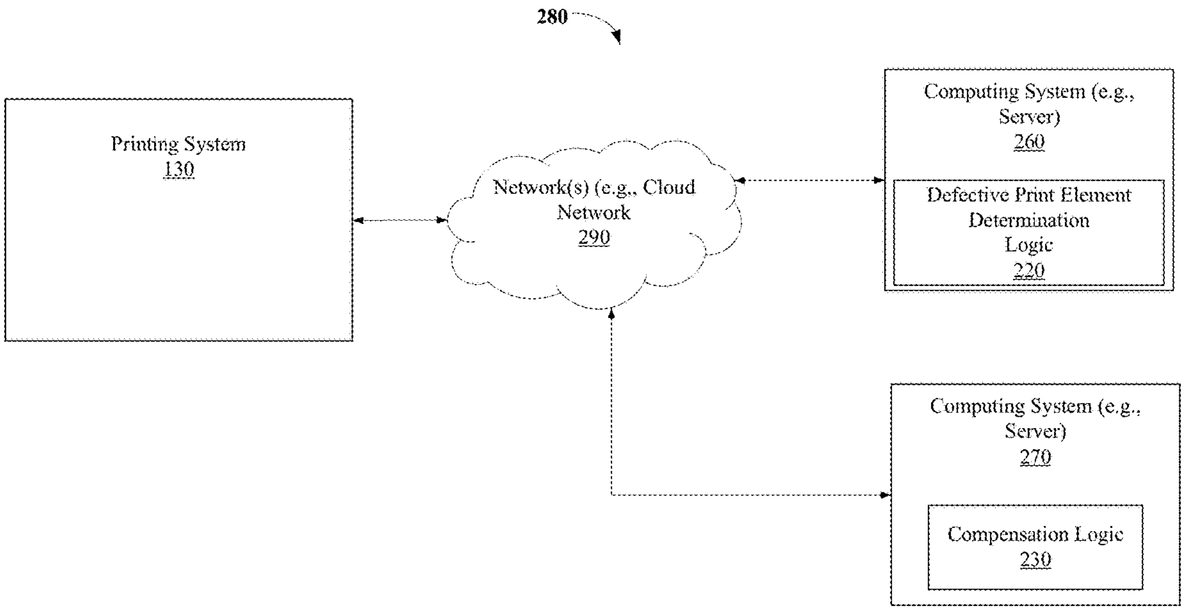
FIG. 2C illustrates another embodiment of defective print element determination logic and compensation logic implemented in a network.

Although shown as a component within a print controller 140, other embodiments may feature defective print element determination logic 220 and compensation logic 230 included within independent devices, or combination of devices, communicably coupled to print controller 140. For instance, FIG. 2C illustrates one embodiment of defective print element determination logic 220 and compensation logic 230 implemented in a network 280. As shown in FIG. 2C, defective print element determination logic 220 and compensation logic 230 are included within a computing systems 260 and 270, respectively, and transmit data to printing system 130 via a cloud network 290.

According to one embodiment, defective print element determination logic 220 receives a print image (e.g., print image measurement data for a test image) including a flushline pattern having flush bars (e.g., evaluation marks) and locator marks (or locators) applied to print medium 180 by pel forming elements 165 according to print instructions. This embodiment identifies pel forming elements 165 that are associated with pels in the print image having print defects (or print defect pels) based on the evaluation marks, the locator marks and the print instructions.

The flushline pattern comprises markings on the print medium used to prevent clogging of pel forming elements 165 due to inactivity by causing each of the pel forming elements to eject ink drops 170 at a rate that avoids clogging. Typically, the flushline pattern is a repeating print pattern placed on each page/sheet that is in addition to the original print job data (i.e., text or images) on each page/sheet. As will be further explained below, locator marks comprise markings (e.g., printed pels) on print medium 180 associated with individual pel forming elements 165 that produced the markings wherein the individual locator marks are spaced apart from each other in a predefined distance in the cross web direction. In the embodiments in this application the flushline beneficially provides dual purposes. It provides adequate flushing to prevent jet clogging and facilitates determination of defective print elements.

Figure 3:
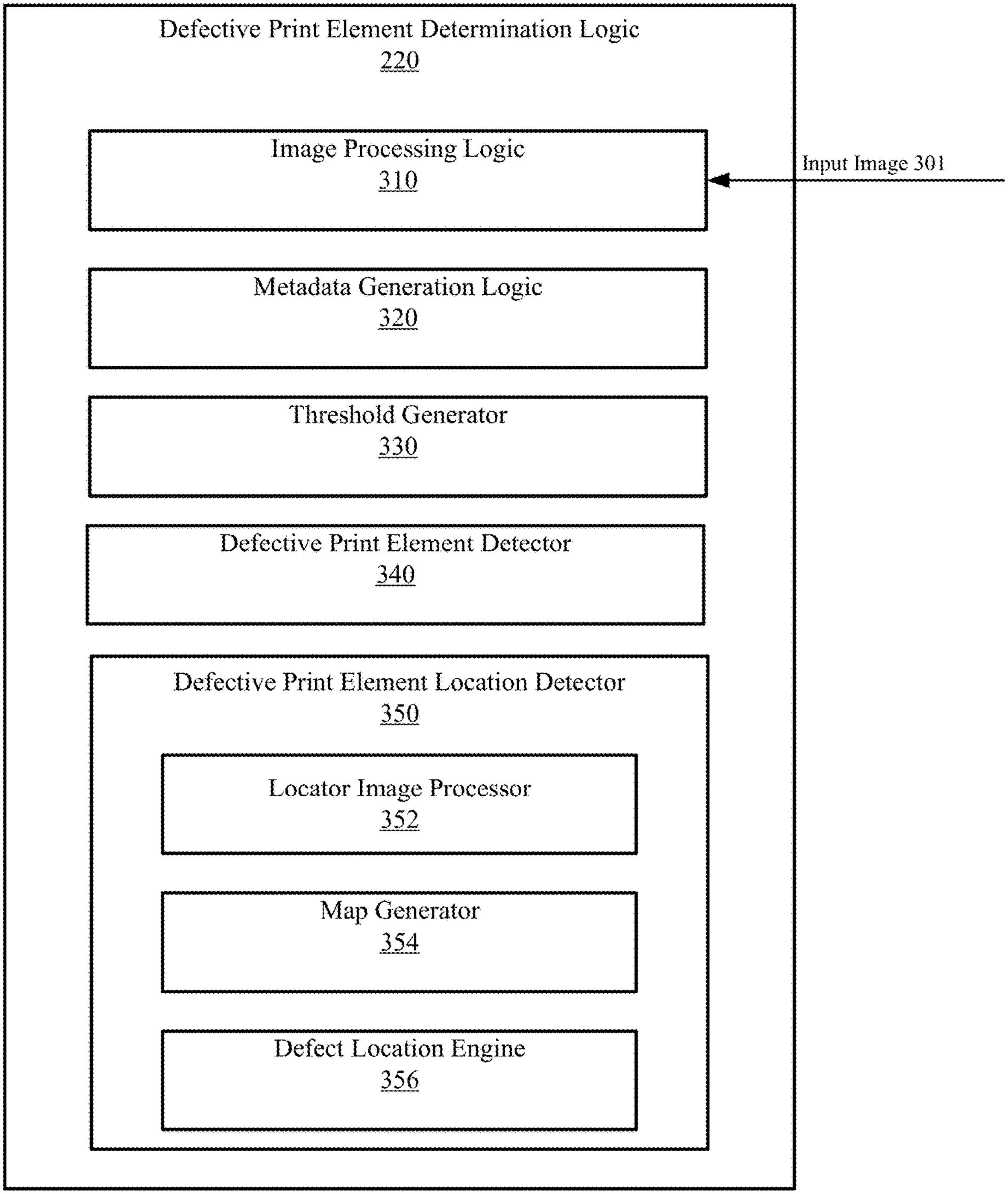
FIG. 3 illustrates one embodiment of defective print element determination logic.

FIG. 3 illustrates one embodiment of defective print element determination logic 220. As shown in FIG. 3, defective print element determination logic 220 includes image processing logic 310, metadata generation logic 320, threshold generator 330, defective print element detector 340 and defective print element location detector 350.

Image processing logic 310 receives an input image 301 for a print pattern including the flushline patterns and locator marks. In one embodiment, the print pattern is designed to identify pel forming element 165 locations (e.g., pel forming element 165 of the array of pel forming elements) associated with print defects (e.g., jet-outs and/or deviated jets). Jet-out defects appear as missing printed pels and are typically caused by a pel forming element 165 that is fully clogged and unable to eject ink. Deviated jet defects appear as printed pels that are significantly far (i.e., more than normal tolerances) from the expected print location and/or smaller than instructed and are typically caused by a partially clogged pel forming element 165. In one embodiment, a flushline pattern includes 'C×n' row of flush bars, where the constant "C" indicates the number of print heads 162. For example, a dual print head system includes two print heads 162 that combine to print one area, hence C=2. The variable 'n' specifies the number of rows printed by each printhead type. For example, a '2×2' row flushline pattern indicates a dual printhead system that places flush bars into four rows, in which the flush bars of each row are printed by pel forming element groups of either print head 162.

Print medium 180 may shrink during a drying process that is part of the printing system, thus causing changes to the printer grid (e.g., the pel forming element column 408 and the location of the corresponding printed pels 409 may have a difference of a delta amount (i.e., an error amount) in the cross web direction 402), which makes location determination in scanned images difficult. Wherein the printer grid is a mapping of the planar surface of the printed medium with intersecting coordinate lines (e.g., cross web direction lines and web movement direction lines which are perpendicular to each other) forming a network of lines. The printer grid provides a map showing the actual printed locations of the printed pels produced by the corresponding pel forming elements 165.

In addition to changes caused by paper drying the printer grid may be deformed due to printhead 162 physical misplacements. To account for the printer grid errors (e.g., changes, deformities, etc.), locator marks are printed in the blank space that already exists in the flushline pattern (e.g., locator marks are printed within the flushline bounding box). Since the pel forming elements 165 producing the locator marks are known based on the print instructions and printer design, in one embodiment, locator marks may be used to map (e.g., register) the printer grid from the scanned image to printer coordinates (e.g., logical address, identification number, physical location, etc.) of the pel forming elements 165 within each printhead 162 without using additional space on the printed page. This mapping provides a means to determine the specific pel forming elements that are malfunctioning from the scanned image data. This forms the basis for map generator 354.

In one embodiment, the locator marks may be configured to utilize all rows of pel forming elements 165 to be captured by the marks. For example, each single printhead 162 having four pel forming element 165 rows, resulting in the spacing between the locator marks being 4*n+1. Thus, the mapping is generated according to all pel forming elements 165 by cycling between the various physical rows of the printhead 162. To account for the printer grid errors (e.g., changes, deformities, etc.), locator marks are printed in the blank space that already exists in the flushline pattern (e.g., locator marks are printed within the flushline bounding box), which beneficially results in a compact space saving format on the printed page.

Figure 4A:
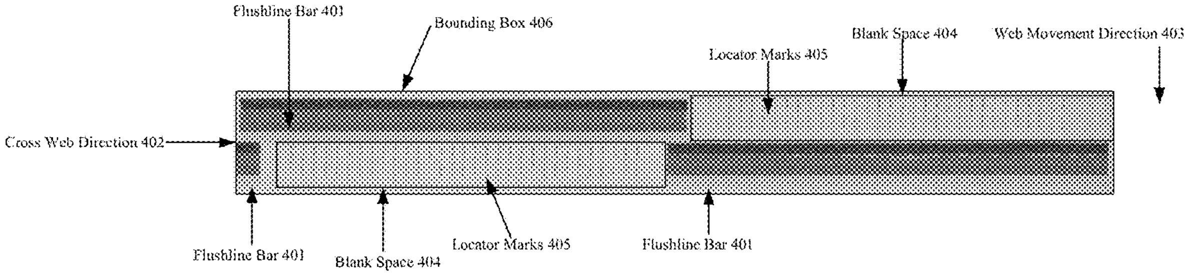
FIGS. 4A-4D illustrate embodiments of a flushline and locator patterns.
Figure 4B:
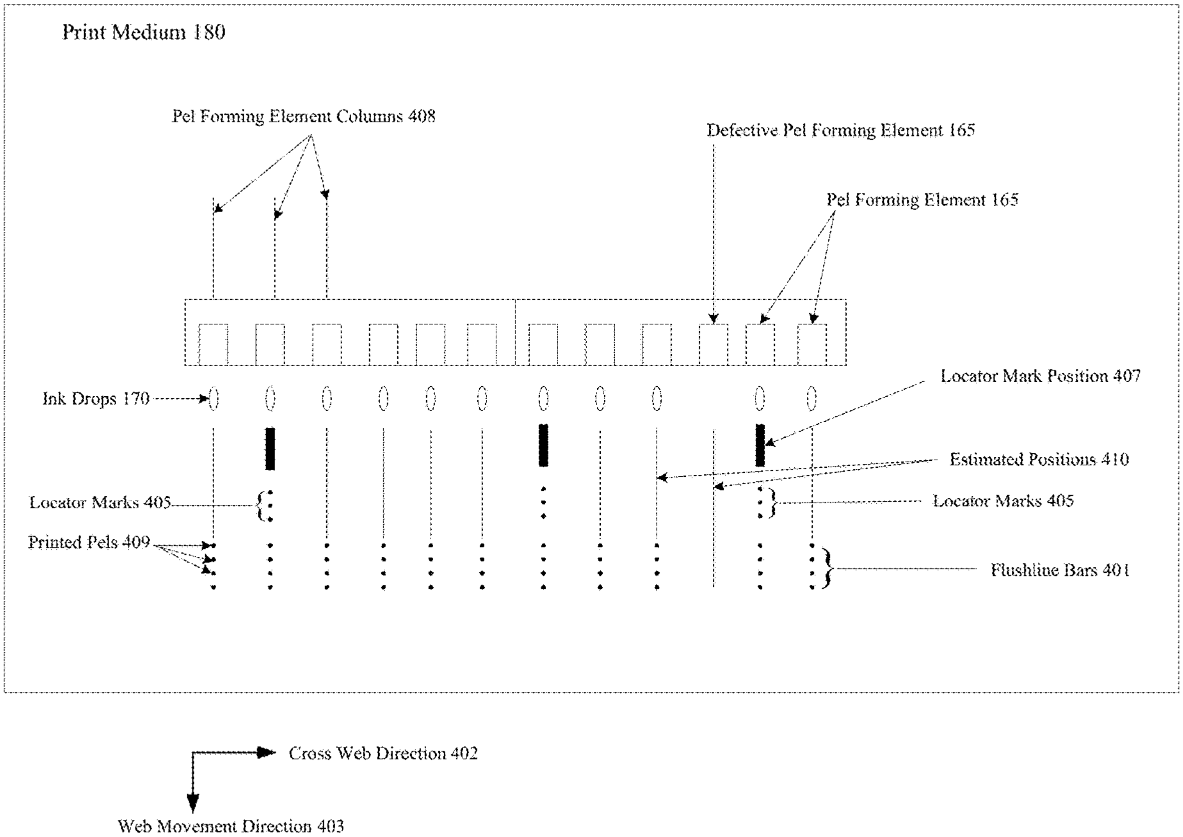

FIG. 4A illustrates one embodiment of locator marks printed in a blank space of a flushline pattern on a print medium 180. As shown in FIG. 4A, the flushline pattern includes flushline bars 401 (e.g., flushline marks), applied in the cross web direction 402 and web movement direction 403. Additionally, the flushline pattern includes blank spaces 404 within which locator marks 405 are printed. Flushline bounding box 406 encompasses the outer boundaries of the flushline bars 401 and the blank spaces 404. Flushline bounding box 406 data may be contained in the print instructions and either printed or not. FIG. 4B illustrates another embodiment of a print medium 180 including flush line bars and locator marks, as well as additional elements that will be discussed in more detail below.

Figure 4C:
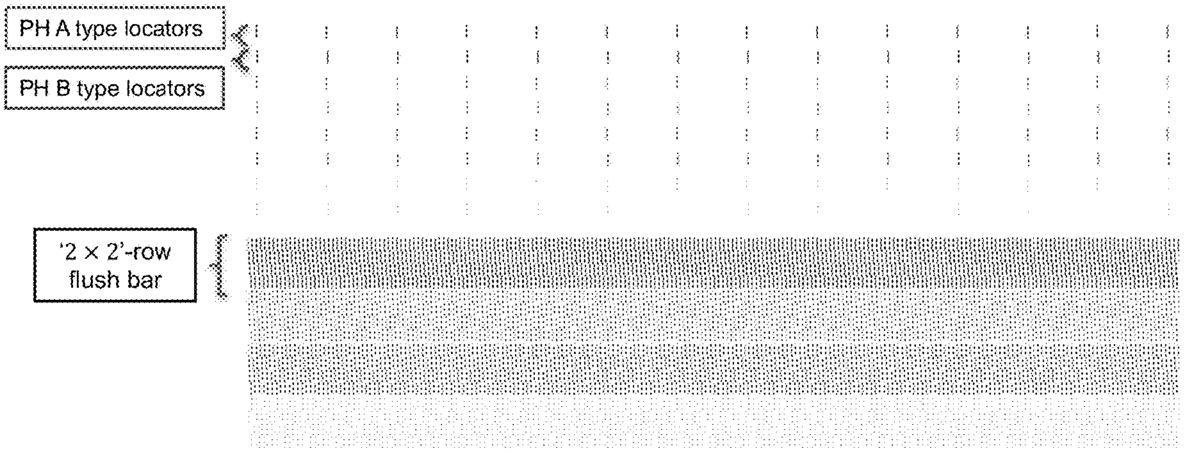

FIG. 4C illustrates one embodiment of a '2×2' row flushline and locator marks pattern design. As shown in FIG. 4C, there are 8 types of locator marks, including printhead A and B type for CMYK color that are printed in the blank space. Where printhead A and printhead B are single printheads forming a dual printhead combination interleaved for example such that A ejects ink for odd pels and B ejects ink for even pels of the printer grid (e.g., consecutive pels of the printer grid are alternatingly produced by printhead A and printhead B). In one embodiment, each row of flush bars is printed by a number of pel forming elements 165 based on print instructions. In combination all rows for a single color eject one or more drops for the entire printhead array for that color to operate every pel forming element 165 for that color.

In one embodiment, print instructions comprise a set of instructions that define the flushline and locator marks, as well as direct particular pel forming elements 165 of print heads 162 to eject ink in a timed sequence to generate the flushline and locator marks on print medium 180. The print instructions are received by printer 160 and interpreted to cause printer 160, printheads 162 and/or pel forming elements 165 to produce the printed markings on the print medium 180.

In other embodiments, the print instructions may also be associated with other printed marks, such as variable data, text or images that may be applied to print medium 180. Once the flushline and locator marks are applied to the print medium 180, the print instructions may be implemented by defective print element determination logic 220 to process the flushline and locator images, as will be discussed in more detail below.

In general, increasing the number of rows of flushline pattern increases print medium 180 usage, while decreasing the amount of ink used to maintain a sufficient height for each pattern region and increasing detection for print mediums having a higher ink spread. A 2-row flush bar (e.g., C=2, n=1) design may be the most cost efficient in terms of saving paper. However, the 2-row flush bar design may only support print medium 180 types of low and medium ink spread. Ink spread is a measure of the extent of the growth of printed marks on a given medium 180 relative to their ideal size, and is a complicating factor because papers having high ink spread make resolving jet-outs difficult, due to the ink from adjacent nozzles filling in the missing ink from the jet-out. For higher speeds that require fewer drops of flushing to maintain good printing for each nozzle, this quantity of flushing drops does not have the vertical height for the image processing to accurately detect jet-outs.

A 4-row flush bar (e.g., C=2, n=2) design may detect defects in any ink spread paper, including a high ink spread that is invisible in the 2-row flush bar pattern. Additionally, the 4-row flush bar design can maintain an appropriate height needed to accurately detect defects for cases that require less flushing ink volume (e.g., high speed printing).

2-row flush bar designs are sufficient for print mediums 180 having low ink spread and printed at slower speeds, while a larger number row flushline design is ideal for print mediums 180 with higher ink spread or when printing at higher speeds, where less flushing ink amount (e.g., ink quantity, volume or mass) per unit length of media is required. FIG. 5 illustrates one embodiment of table of a comparison of flushline patterns for C=2.

Image processing logic 310 performs processing of a received image. However prior to processing, image processor may perform various pre-processing tasks. Such pre-processing tasks may include one or more of rotating, skewing, scaling process to facilitate accurate processing. After pre-processing has been performed, image processing logic 310 processes the received image by finding the flushline pattern within the image, finding color regions of interest (ROI) and mitigating skew in the color ROI.

Figure 4D:
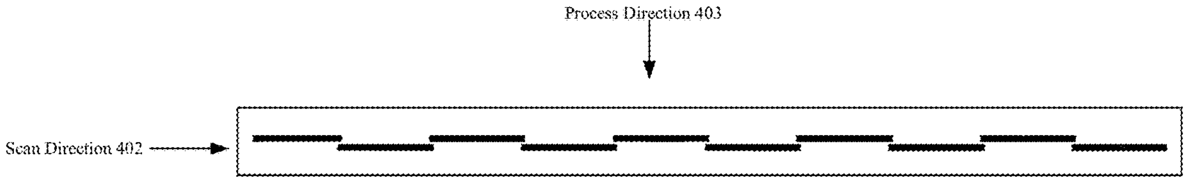

In one embodiment, image processing logic 310 finds the flushline pattern and/or printheads 162 by using a thresholding process to separate image pels into two classes: 1) flushline markings; and 2) background (e.g., unprinted areas of the print medium). In this embodiment, the identified print heads 162 are evaluated by calculating an aspect ratio. In a further embodiment, the thresholding process implements an Otsu's thresholding method to separate the pels. The Otsu's thresholding method involves iterating through all possible threshold values and calculating a measure of spread for the pel level each side of the threshold (e.g., the pels that either fall ire foreground or background). Further, the print instructions provide pel locations for the flushline pattern elements (e.g., flushline bars, flushline bounding box, locator marks, and/or etc.) and/or printheads 162 in the sheet image. FIG. 4D illustrates one embodiment of flushlines separated by background.

Figure 6:
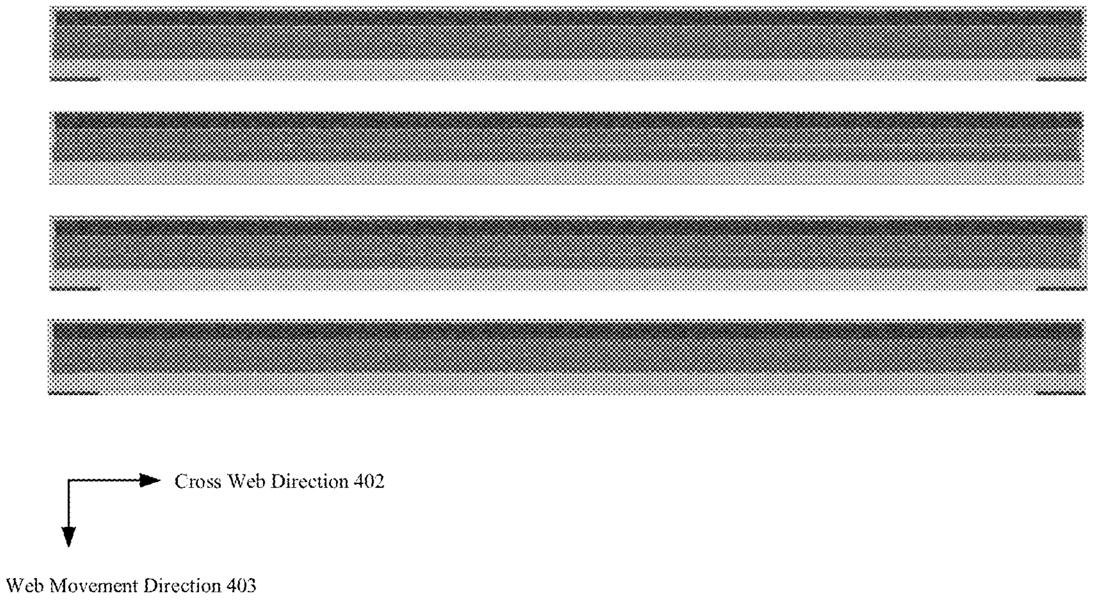
FIG. 6 illustrates one embodiment of color regions.
Figure 7:
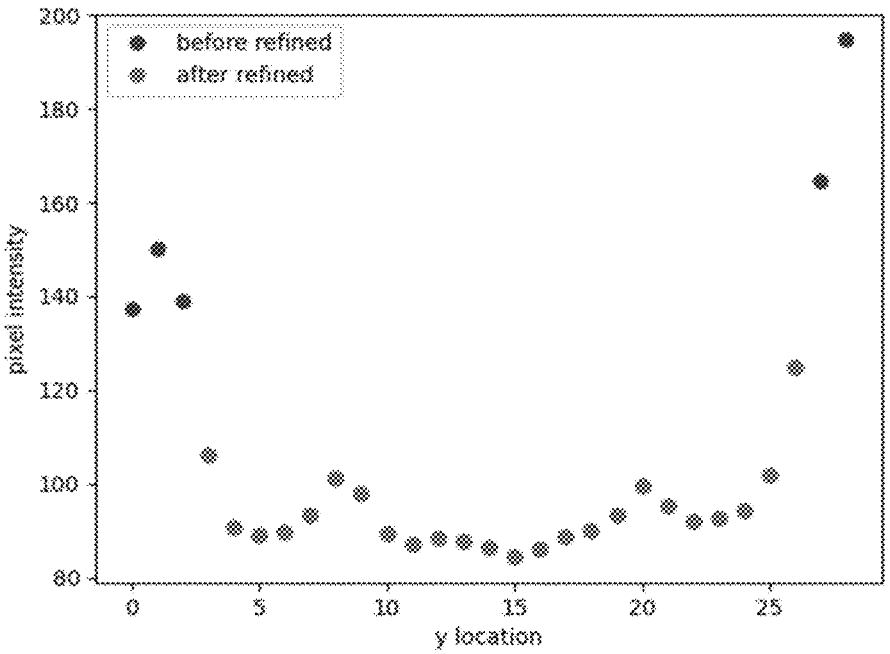
FIG. 7 illustrates one embodiments of a graph of pixel signal intensity as a function of pixel location.

To find a color ROI in the image, image processing logic 310 separates the image into Red, Green and Blue (RGB) channels. In one embodiment, image processing logic 310 performs bitwise operations on two channels to obtain each color domain (e.g., process color domain such as C, M, Y and/or K). For example, the Black region of interest is obtained by 'bitwise or' operation on B and R channel. Further, the print instructions may be used to locate the different color regions of interest. In another embodiment, the color channel pel signal intensities of each color channel are determined based on monochrome images. In an alternative embodiment, a primary opposed color channel is used to extract out the most data from a single RGB channel. For example Red for cyan, green for magenta and black, and blue for yellow may be used. FIG. 6 illustrates one embodiment of color regions of interest. Using the obtained region in binary image, the refinement of the color regions of interest is followed by analyzing pel (or pixel) signal intensities of its corresponding channel. FIG. 7 illustrates one embodiments of a graph of pixel signal intensity as a function of pixel location (e.g., pixel position in the web movement direction).

Figure 8A:
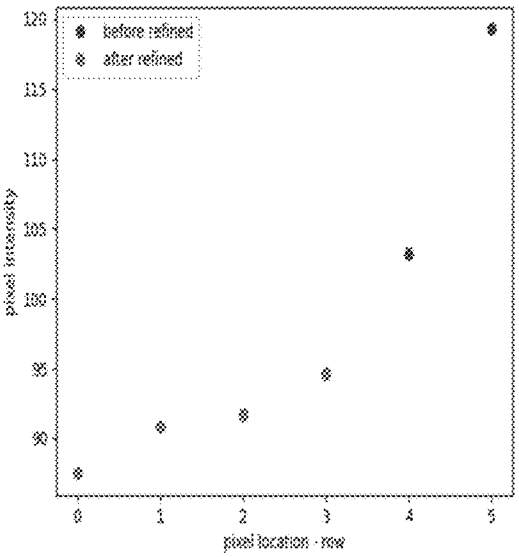
FIGS. 8A & 8B illustrate other embodiments of graphs of signal pixel intensity as a function of pixel location; of interest.
Figure 8B:
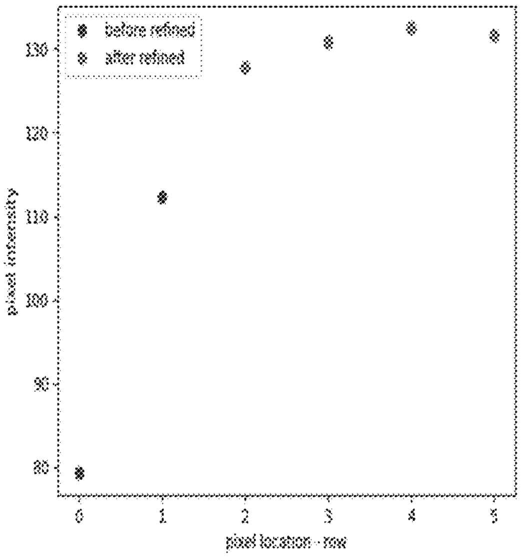

Image processing logic 310 also refines row ROI to mitigate skew. When skew occurs, the affected rows that tend to have higher pixel strength may be included. Skew may also affect defective (e.g., jet-out) pixels and reduce the intensity of the jet-out signal. FIG. 8A illustrates one embodiment of refining ROI when skew occurs, while FIG. 8B illustrates one embodiment of refining ROI when jet-outs exist.

Figure 9:
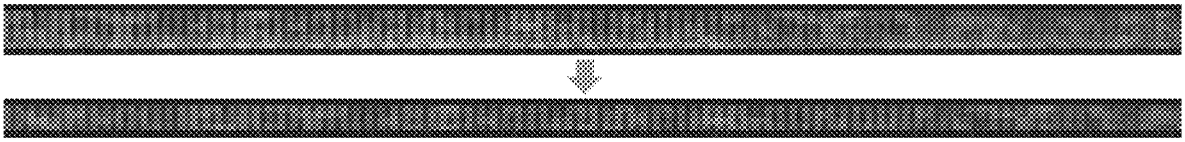
FIG. 9 illustrates one embodiment of row refinement of regions.
Figure 9:
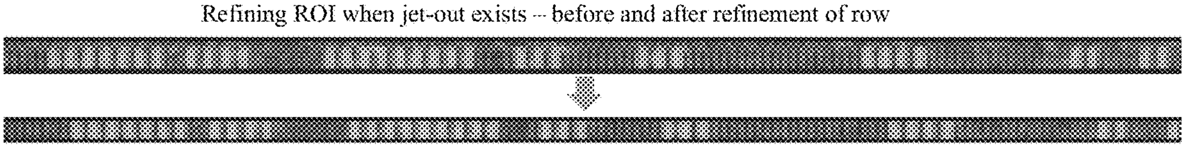

To mitigate the effect of skew on affected rows, image processing logic 310 groups consecutive rows by the number of flushbar height−2. This process assumes that the maximum number of skew affected rows is 2. Subsequently, the standard deviation of each group is calculated to find the group with the lowest standard deviation that returns the refined row region. FIG. 9 illustrates one embodiment of refining ROI when skew occurs and refining ROI when jet-outs exist.

Figure 10:
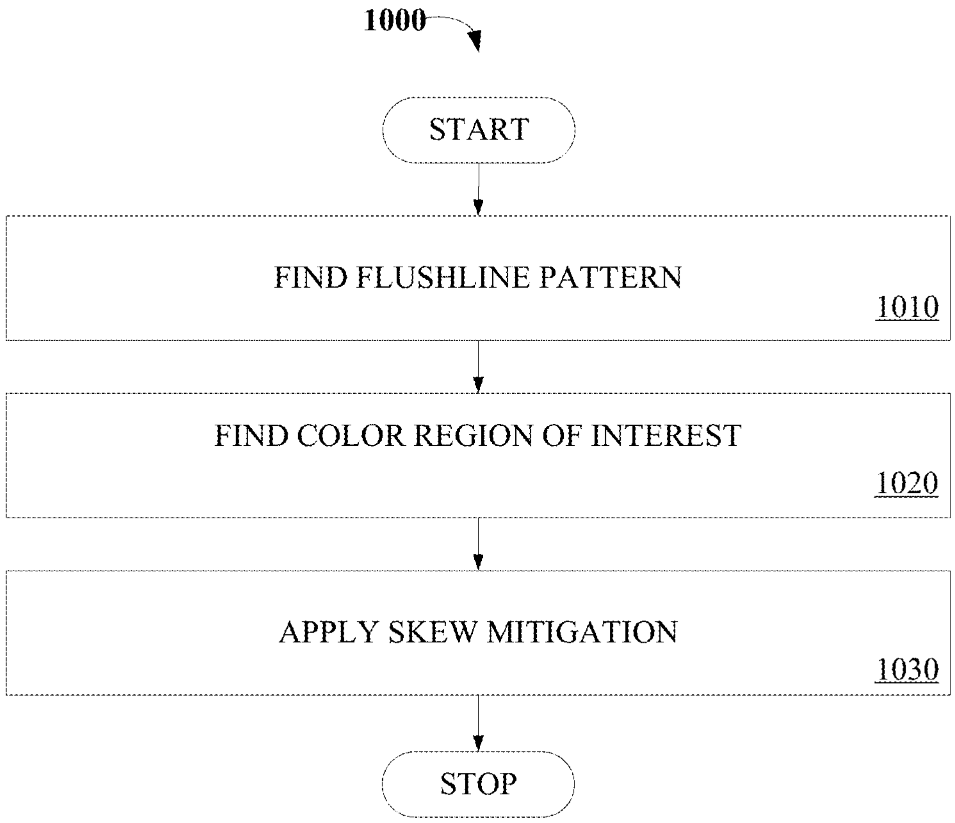
FIG. 10 is a flow diagram illustrating one embodiment of a process for performing image processing.

FIG. 10 is a flow diagram illustrating one embodiment of a process 1000 for performing image processing. Process 1000 may be performed by processing logic that may include hardware (e.g., circuitry, dedicated logic, programmable logic, microcode, etc.), software such as instructions run on a processing device, or a combination thereof. In one embodiment, process 1000 is performed by image processing logic 310. According to one embodiment, process 1000 begins at processing block 1010, where flushline patterns are found in the print image. At processing block 1020, the color ROI are found in the print image. At processing block 1030, the skew mitigation is applied to the ROI. In embodiments processing block 1030 may be omitted if skew mitigation is determined to be not needed.

Referring back to FIG. 3, metadata generation logic 320 generates print head metadata to determine jet-out thresholds. Determining a jet-out threshold is challenging because jet-outs at a pel forming element 165 and jet-outs at adjacent pel forming elements 165 both have similar pixel signal intensity values. Thus, when many jet-outs occur in a print head 162 pixel intensity distribution cannot be relied on to determine jet-out threshold. Pixel intensity values (e.g., pixel signal intensity values) for image pel locations may be located in the print head metadata or the print image data.

According to one embodiment, print head metadata uses collective print head 162 information to generate a jet-out threshold. In such an embodiment, print head metadata is generated for each color ROI (e.g., row of flush bars), and includes information associated with print head identification number, color, type, signals and jet-out threshold related information. For example, in an embodiment in which print head metadata is to be used to determine Cyan jet-outs there are forty (40) sets of print head metadata, when there are 10 separate print heads using a 4-row flushline design. After iterating through all print heads 162 over a print medium 180 page, a jet-out threshold for each color channel may be determined and used to check for jet-out presence in each color channel for all print heads 162.

Threshold generator 330 uses the print head metadata to generate a jet-out threshold for each color channel. In one embodiment, a jet-out threshold uses an interquartile range (IQR) to exclude pixel intensity data corresponding to jet-outs by excluding pixel intensity data that falls outside of upper and lower quartiles of data. In this embodiment, the lower quartile corresponds with 25 percentile, while the upper quartile corresponds with 75 percentile. As a result, the IQR range method determines outliers that are jet-outs. In a further embodiment, the formula for jet-out threshold follows:

jetout threshold=upper quartile+IQR*IQR factor; and

IQR=upper quartile−lower quartile, where IQR factor varies depending on paper type and flushline design(2-row vs. 4-row).

Thus, the IQR value is an empirical value due to its different pixel signal intensity distribution by paper.

Defective print element detector 340 applies the jet-out threshold for each color channel to detect the presence of one or more defective printed pels (e.g., jet-outs) corresponding to the color channel. According to one embodiment, defective print element detector 340 applies the jet-out threshold by comparing the jet-out threshold value to the pixel intensity values corresponding to each printed pel in the evaluation marks (i.e., flushline marks). Pel locations in the print image with a pixel intensity that is outside the range of the jet-out threshold are labeled as defective (e.g., labeled as a jet-out). Pel locations in the print image with a pixel intensity that is within the range of the jet-out threshold are labeled as not defective (e.g., labeled as not a jet-out). By design there may be unprinted space between flushline bars in the cross web direction. In that case, the print defect detection is instructed to only detect defects at the locations of the printed flushline bars wherein the printed flushline bar locations are determined based on the print instructions. Upon a determination at defective print element detector 340 that no additional jet-outs are present, the process is completed. However, defective print element detector 340 transfers control to defective print element location detector 350, upon a determination that there are one or more jet-outs present, to determine the jet-out locations.

According to one embodiment, defective print element location detector 350 uses the locator marks to determine the coordinates associated with print head 162 jet-out locator regions (e.g., the regions in the image that contain the locator marks printed by a printhead 162). In such an embodiment, defective print element location detector 350 includes locator image processor 352 to find the locator marks. In one embodiment, locator image processor 352 convolves a locator region with a vertical edge kernel to intensify a locator pixel intensity signal and aid accurate detection. In such an embodiment, this process is performed on the corresponding red, green and blue (RGB) channel for an individual color. In one embodiment, a vertical edge kernel is a matrix consisting of vertical derivative approximations. Convolving the locator image with a vertical edge kernel results in a transformed locator image that beneficially emphasizes vertical edge regions that correspond to locator marks.

Figure 11:
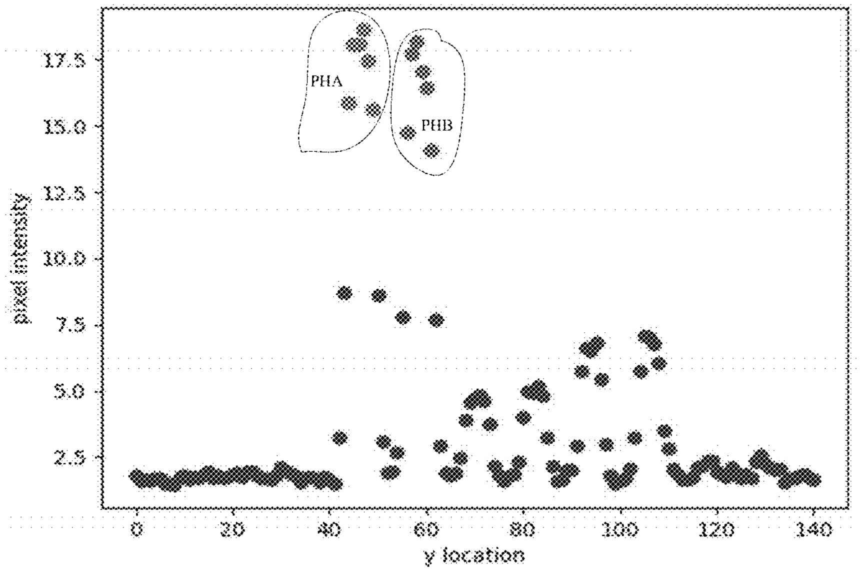
FIG. 11 illustrates one embodiment of refined locator regions.

Subsequently, locator image processor 352 finds the locator regions by finding and separating the locator regions corresponding to each printhead 162. FIG. 11 illustrates one embodiment of refinement of locator regions. As shown in FIG. 11, regions for a print head A and a print head B have been separated. Locator image processor 352 then finds the locator coordinates at sub-pixel precision. Since a locator mark, as well as a jet-out, may affect multiple pels (e.g., pixels) the coordinates of those signals may be difficult to register. Thus, determining the peak of Gaussian profiles at sub-pixel level is beneficially more reliable than integer peak locations when a scanned image is affected by print medium 180 shrinkage. Accordingly, locator image processor 352 generates cross web direction positions of the locator marks at a sub-pixel coordinate resolution by fitting a Gaussian profile ink distribution to each of the locator marks.

The basis for the Gaussian profile model is the ink distribution on print media for a single pel forming element 165. A Gaussian distribution is implemented to model how ink from a pel forming element 165 gradually spreads away from the center and provides a closed form expression for the ink deposition across the single pel forming element 165 for the ink applied to the print media. In one embodiment, a one-dimensional Gaussian profile distribution of ink is implemented.

Figure 12:
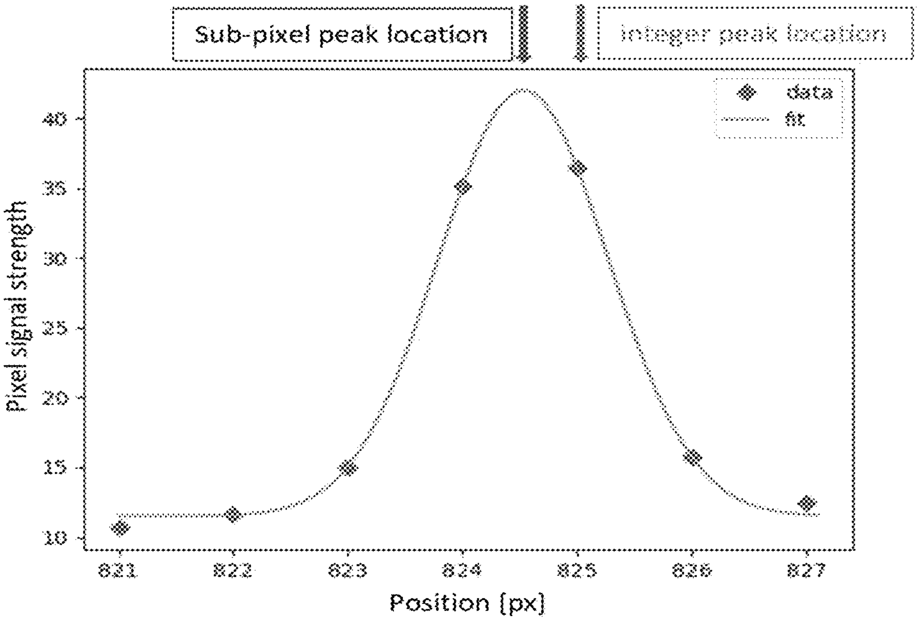
FIG. 12 illustrates one embodiment of a gaussian fit to find a peak at sub-pixel level.

FIG. 12 illustrates one embodiment of a Gaussian fit to find a peak at sub-pixel level for a single pel forming element by showing pixel signal strength (e.g., intensity) versus position (e.g., position in the cross web direction). In FIG. 12, the orientation of pixel signal strength is such that high pixel strength corresponds to a larger ink density and the lowest pixel signal strength corresponds to the print medium with the least amount of ink density. Print images with pixel signal strength orientation that is inverse to this may also be processed accordingly.

Defective print element location detector 350 also includes map generator 354 to generate a pel forming element map that maps the cross web direction positions of the pels of locator marks in the print image to pel forming elements 165 based on the print instructions. In one embodiment, print instructions provide information regarding the pel forming elements 165 that contributed to printing the locator marks, which is then used to generate the map.

Map generator 354 also further generates a pel forming element map that generally maps image pixel positions (e.g., locations) to additional corresponding pel forming elements 165 by estimating additional image pixel positions (e.g., estimated positions 410) in addition to locator mark positions 407 (e.g., interpolation). The map is generated based on the locator mark pixel positions and the print instructions. The map may be further enhanced by generating the map using an estimation model (i.e., pixel position estimation model) to provide additional image pixel positions in the cross web direction that are in addition to the locator mark positions in the cross web direction. By generating the map to include the additional cross web direction image pixel positions, the technical benefit of mapping additional image pixel positions to corresponding pel forming elements is realized (e.g., mapping flush mark pixel positions to corresponding pel forming elements).

Generating a map for flushline mark pixel positions based on locator mark positions yields technical benefits such as minimizing error (i.e., distortion) due to paper shrinkage because the locator marks and the flushline marks experience nearly the same paper shrinkage. In addition, by design the locator marks are beneficially simpler to detect with accuracy than flushline marks. Map generator 354 may generate an estimation model using regression (e.g., linear regression) or interpolation (e.g., linear, piecewise, polynomial or spline interpolation) to facilitate generation of the pel forming element map. As a result, estimation is performed with the estimation model based on the positions of the locator marks to determine cross web direction positions of additional pixels of the print image.

In one embodiment, sub-pixel coordinate resolutions are used for the locator marks positions which results in a technical benefit of a higher accuracy pel forming element mapping. In a further embodiment, pel forming elements 165 associated with unprinted locator marks attributed to jet-outs are discarded since there are sufficient locator marks to generate an accurate estimation model with the resulting technical benefit that the estimation model is not impacted by unprinted locator marks attributed to jet-outs.

Prior to performing the estimation, map generator 354 inputs the cross web direction positions of the locator marks from locator image processor 352. In one embodiment, the cross web direction positions of jet-outs are input by applying a Gaussian fit to jet-out signals to obtain the subpixel-level jet-out mapping between the cross web direction positions of the jet-outs to corresponding pel forming elements 165. In such an embodiment, the flushline pattern of each ink color channel is applied in a lockstep fashion. This process is applicable to a 2-row flushline pattern in which each flush bar is placed next to one another. Thus, fitting Gaussian to jet-out signals results in jet-out coordinates in sub-pixel resolution.

In an alternative embodiment, the cross web direction positions are input by using known information that specifies the correspondence between pel forming elements 165 and the pels of the print pattern design (i.e., based on the print instructions for the flushline pattern). This embodiment may be employed in instances in which each of the flushline pattern pels correspond to pel forming elements 165 jet ink by a predetermined design. In such an embodiment, the integer-level coordinates are sufficient to accurately locate corresponding defective (i.e., jet-out) pel forming elements 165. For example, a 4-row flushline pattern design determines which pel forming elements 165 are observed in a specific row. Sub-pixel errors occurred by jet-out coordinates at integer level do not affect the accuracy of jet-out nozzle location determinations in that case.

Defect location engine 356 identifies pel forming elements 165 associated with the print defect pels based on the print defect pels locations and the pel forming element map. For example, the determination of the specific pel forming elements 165 related to the defect pel locations in the scanned image data is determined based on the pel forming element map.

Figure 13A:
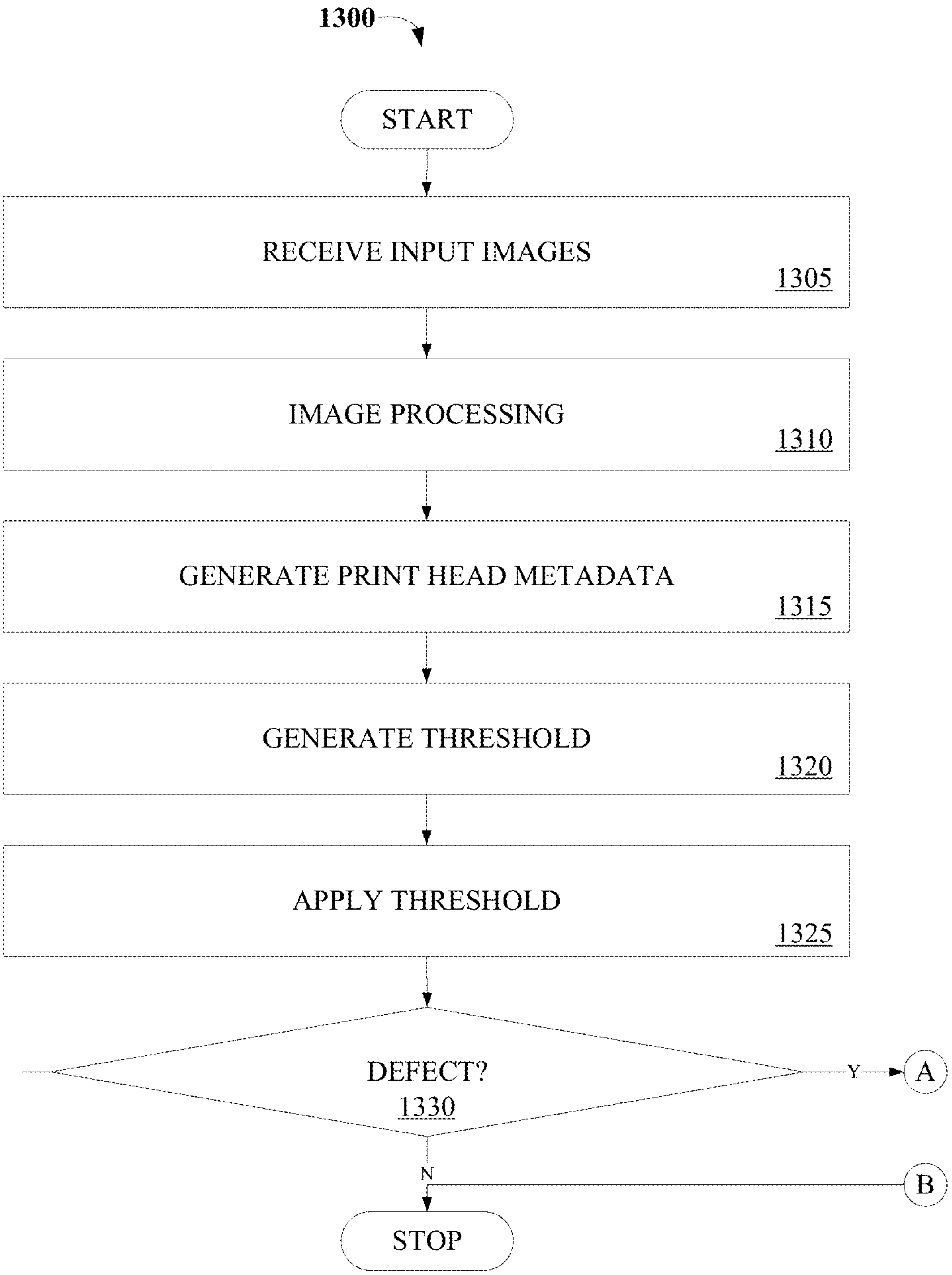
FIGS. 13A & 13B is a flow diagram illustrating one embodiment of a process performed by defective print element determination logic.
Figure 13B:
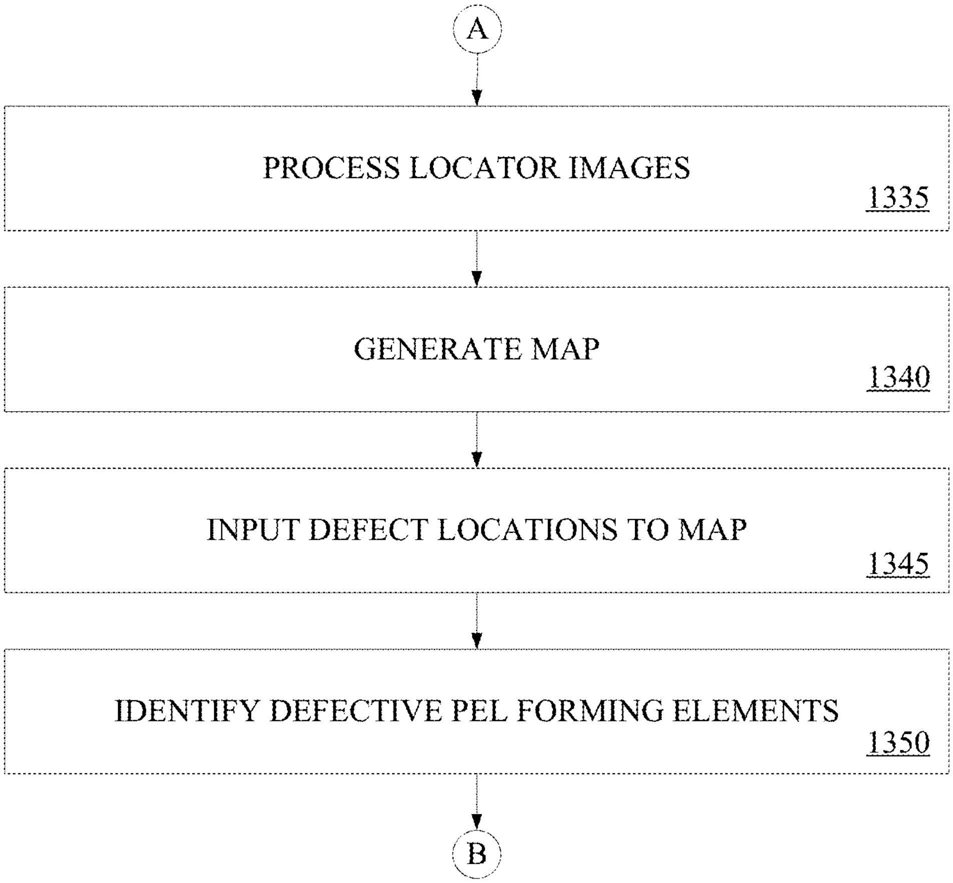

FIGS. 13A & 13B are flow diagrams illustrating one embodiment of a process 1300 for determining pel forming elements 165. Process 1300 may be performed by processing logic that may include hardware (e.g., circuitry, dedicated logic, programmable logic, microcode, etc.), software such as instructions run on a processing device, or a combination thereof. In one embodiment, process 1300 is performed by defective print element determination logic 220.

According to one embodiment, process 1300 begins at processing block 1305 (FIG. 13A), where input images including flushline patterns and locator marks are received. At processing block 1310, image processing is performed. As discussed above, image processing comprises finding print heads 162, finding color ROI and mitigating skew in the row ROI. At processing block 1315, print head metadata is generated. At processing block 1320, a jet-out threshold is generated using the print head metadata. At processing block 1325, the threshold is applied to the corresponding color channel ROI.

At decision block 1330, a determination is made as to whether one or more jet-outs exist. If so, the process branches to point A. Where A is the start of the FIG. 13B flowchart to process locator images at processing block 1335. If no jet-outs exist the process exits. As discussed above, processing the locator images comprises finding the locator marks and finding the locator coordinates at sub-pixel precision.

At processing block 1340, a pel forming element map is generated between the cross web direction positions of the pels in the print image and the corresponding pel forming elements 165. As discussed above, the map is generated using an estimation model and performing regression or interpolation to determine cross web direction positions of pixels of the print image. At processing block 1345, the defect locations are input into the generated map. At processing block 1350, the defective pel forming elements 165 are located.

Referring back to FIGS. 2, compensation logic 230 receives information regarding the defective pel forming elements 165 and performs compensation to generate print defect compensation values associated with each of the pel forming elements 165 associated with the print defect pels. In one embodiment, the print defect compensation values comprise compensated transfer functions associated with pel forming elements 165 neighboring the defective pel forming elements 165, which are applied directly to image data as a part of an image processing prior to printing.

In another embodiment, the print defect compensation values may be applied to a halftone design (e.g., halftone threshold array) to generate a compensated halftone design. In such an embodiment, the print defect compensation values may be applied to halftone thresholds in the halftone design to generate the compensated halftone design. Once generated, the print defect compensation values may be transmitted to printer 160, which applies the print defect compensation values to the pel forming elements 165 neighboring the print defect pels to print data according to print instructions.

Although not described in detail above, embodiments of the defective print element determination 220 and compensation logic 230 are performed for each color channel associated with the pel forming elements 165 employing the print image information as described above.

Figure 14:
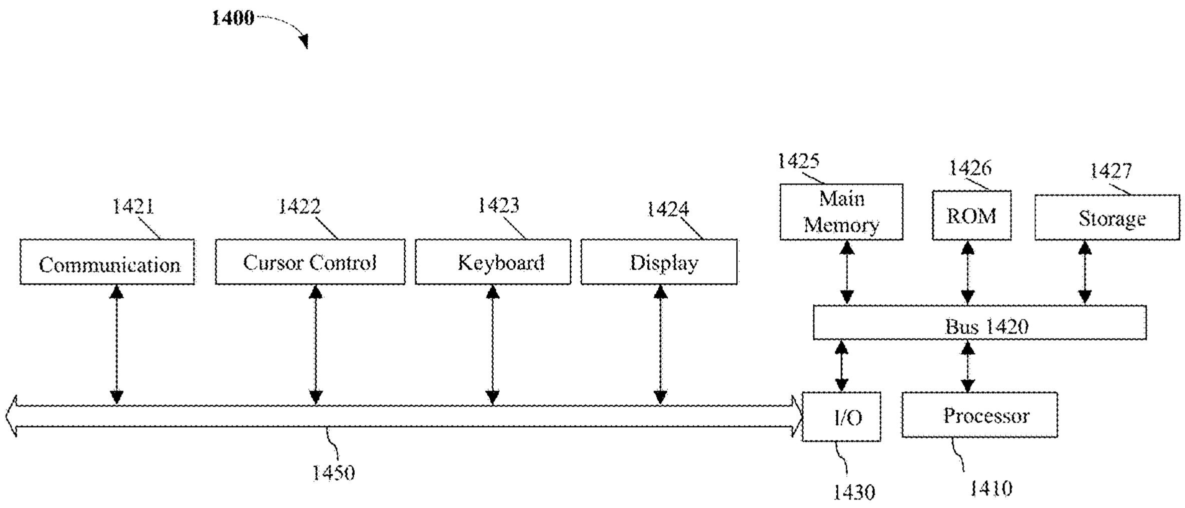
FIG. 14 illustrates one embodiment of a computer system.

FIG. 14 illustrates a computer system 1400 on which printing system 130, print controller 140, defective print element determination logic 220 and/or compensation logic 230 may be implemented. Computer system 1400 includes a system bus 1420 for communicating information, and a processor 1410 coupled to bus 1420 for processing information.

Computer system 1400 further comprises a random access memory (RAM) or other dynamic storage device 1425 (referred to herein as main memory), coupled to bus 1420 for storing information and instructions to be executed by processor 1410. Main memory 1425 also may be used for storing temporary variables or other intermediate information during execution of instructions by processor 1410. Computer system 1400 also may include a read only memory (ROM) and or other static storage device 1426 coupled to bus 1420 for storing static information and instructions used by processor 1410.

A data storage device 1427 such as a magnetic disk or optical disc and its corresponding drive may also be coupled to computer system 1400 for storing information and instructions. Computer system 1400 can also be coupled to a second I/O bus 1450 via an I/O interface 1430. A plurality of I/O devices may be coupled to I/O bus 1450, including a display device 1424, an input device (e.g., an alphanumeric input device 1423 and or a cursor control device 1422). The communication device 1421 is for accessing other computers (servers or clients). The communication device 1421 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

Some embodiments pertain to Example 1 that includes a system comprising at least one physical memory device to store defective print element determination logic and one or more processors coupled with the at least one physical memory device to execute the defective print element determination logic to receive a print image comprising evaluation marks and locator marks applied to a print medium by a plurality of pel forming elements according to print instructions and identify pel forming elements associated with print defect pels in the print image among the plurality of pel forming elements based on the evaluation marks, the locator marks and the print instructions.

Example 2 includes the subject matter of Example 1, wherein the defective print element determination logic further identifies the evaluation marks and the locator marks in the print image based on the print instructions and detects the print defect pels based on pixel intensity of the evaluation marks.

Example 3 includes the subject matter of Examples 1 and 2, wherein the defective print element determination logic further generates cross web direction positions of the locator marks at a sub-pixel coordinate resolutions by fitting a Gaussian distribution to each of the locator marks.

Example 4 includes the subject matter of Examples 1-3, wherein the defective print element determination logic further generates an estimation model based on the positions of the locator marks to determine cross web direction positions of additional pels of the print image.

Example 5 includes the subject matter of Examples 1-4, wherein the defective print element determination logic further generates a pel forming element map that maps the cross web direction positions of the locator marks and additional pels of the print image to the corresponding pel forming elements based on the estimation model and print instructions.

Example 6 includes the subject matter of Examples 1-5, wherein the defective print element determination logic identifies print pel forming elements associated with the print defect pels based on the print defect pels and the pel forming element map.

Example 7 includes the subject matter of Examples 1-6, wherein the physical memory device further stores compensation logic and the one or more processors execute the compensation logic to generate print defect compensation values for each of the pel forming elements associated with the print defect pels.

Example 8 includes the subject matter of Examples 1-7, wherein the compensation logic transmits the print defect compensation values.

Example 9 includes the subject matter of Examples 1-8, further comprising a print engine to print the print data.

Some embodiments pertain to Example 10 that includes a method comprising receiving a print image comprising evaluation marks and locator marks applied to a print medium by a plurality of pel forming elements according to print instructions and identifying pel forming elements associated with print defect pels in the print image among the plurality of pel forming elements based on the evaluation marks, the locator marks and the print instructions.

Example 11 includes the subject matter of Example 10, further comprising identifying the evaluation marks and the locator marks in the print image based on the print instructions and detects the print defect pels based on pixel intensity of the evaluation marks.

Example 12 includes the subject matter of Examples 10 and 11, further comprising generating cross web direction positions of the locator marks at a sub-pixel coordinate resolutions by fitting a Gaussian distribution to each of the locator marks.

Example 13 includes the subject matter of Examples 10-12, further comprising generating an estimation model based on the positions of the locator marks to determine cross web direction positions of additional pels of the print image.

Example 14 includes the subject matter of Examples 10-13, further comprising generating a pel forming element map that maps the cross web direction positions of the locator marks and additional pels of the print image to the corresponding pel forming elements based on the estimation model and print instructions.

Example 15 includes the subject matter of Examples 10-14, further comprising identifying print pel forming elements associated with the print defect pels based on the print defect pels and the pel forming element map.

Some embodiments pertain to Example 16 that includes at least one computer readable medium having instructions stored thereon, which when executed by one or more processors, cause the processors to receive a print image comprising evaluation marks and locator marks applied to a print medium by a plurality of pel forming elements according to print instructions; and identify pel forming elements associated with print defect pels in the print image among the plurality of pel forming elements based on the evaluation marks, the locator marks and the print instructions.

Example 17 includes the subject matter of Example 16, having instructions stored thereon, which when executed by one or more processors, further cause the processors to identify the evaluation marks and the locator marks in the print image based on the print instructions and detects the print defect pels based on pixel intensity of the evaluation marks.

Example 18 includes the subject matter of Examples 16 and 17, having instructions stored thereon, which when executed by one or more processors, further cause the processors to generate cross web direction positions of the locator marks at a sub-pixel coordinate resolutions by fitting a Gaussian distribution to each of the locator marks.

Example 19 includes the subject matter of Examples 16-18, having instructions stored thereon, which when executed by one or more processors, further cause the processors to generate an estimation model based on the positions of the locator marks to determine cross web direction positions of additional pels of the print image.

Example 20 includes the subject matter of Examples 16-19, having instructions stored thereon, which when executed by one or more processors, further cause the processors to generate a pel forming element map that maps the cross web direction positions of the locator marks and additional pels of the print image to the corresponding pel forming elements based on the estimation model and print instructions.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A system comprising:

at least one physical memory device to store defective print element determination logic; and one or more processors coupled with the at least one physical memory device to execute the defective print element determination logic to:

receive a print image comprising evaluation marks and locator marks applied to a print medium by a plurality of pel forming elements according to print instructions; and identify pel forming elements associated with print defect pels in the print image among the plurality of pel forming elements based on the evaluation marks, the locator marks and the print instructions.

2. The system of claim 1, wherein the defective print element determination logic further identifies the evaluation marks and the locator marks in the print image based on the print instructions and detects the print defect pels based on pixel intensity of the evaluation marks.

3. The system of claim 2, wherein the defective print element determination logic further generates cross web direction positions of the locator marks at a sub-pixel coordinate resolutions by fitting a Gaussian distribution to each of the locator marks.

4. The system of claim 3, wherein the defective print element determination logic further generates an estimation model based on the positions of the locator marks to determine cross web direction positions of additional pels of the print image.

5. The system of claim 4, wherein the defective print element determination logic further generates a pel forming element map that maps the cross web direction positions of the locator marks and the additional pels of the print image to corresponding pel forming elements based on the estimation model and the print instructions.

6. The system of claim 5, wherein the defective print element determination logic identifies print pel forming elements associated with the print defect pels based on the print defect pels and the pel forming element map.

7. The system of claim 6, wherein the physical memory device further stores compensation logic and the one or more processors execute the compensation logic to generate print defect compensation values for each of the pel forming elements associated with the print defect pels.

8. The system of claim 7, wherein the compensation logic transmits the print defect compensation values.

9. The system of claim 1, further comprising a print engine to print print data.

10. A method comprising:

receiving a print image comprising evaluation marks and locator marks applied to a print medium by a plurality of pel forming elements according to print instructions; and identifying pel forming elements associated with print defect pels in the print image among the plurality of pel forming elements based on the evaluation marks, the locator marks and the print instructions.

11. The method of claim 10, further comprising identifying the evaluation marks and the locator marks in the print image based on the print instructions and detects the print defect pels based on pixel intensity of the evaluation marks.

12. The method of claim 11, further comprising generating cross web direction positions of the locator marks at a sub-pixel coordinate resolutions by fitting a Gaussian distribution to each of the locator marks.

13. The method of claim 12, further comprising generating an estimation model based on the positions of the locator marks to determine cross web direction positions of additional pels of the print image.

14. The method of claim 13, further comprising generating a pel forming element map that maps the cross web direction positions of the locator marks and additional pels of the print image to corresponding pel forming elements based on the estimation model and the print instructions.

15. The method of claim 14, further comprising identifying print pel forming elements associated with the print defect pels based on the print defect pels and the pel forming element map.

16. At least one computer readable medium having instructions stored thereon, which when executed by one or more processors, cause the processors to:

receive a print image comprising evaluation marks and locator marks applied to a print medium by a plurality of pel forming elements according to print instructions; and identify pel forming elements associated with print defect pels in the print image among the plurality of pel forming elements based on the evaluation marks, the locator marks and the print instructions.

17. The computer readable medium of claim 16, having instructions stored thereon, which when executed by one or more processors, further cause the processors to identify the evaluation marks and the locator marks in the print image based on the print instructions and detects the print defect pels based on pixel intensity of the evaluation marks.

18. The computer readable medium of claim 17, having instructions stored thereon, which when executed by one or more processors, further cause the processors to generate cross web direction positions of the locator marks at a sub-pixel coordinate resolutions by fitting a Gaussian distribution to each of the locator marks.

19. The computer readable medium of claim 18, having instructions stored thereon, which when executed by one or more processors, further cause the processors to generate an estimation model based on the positions of the locator marks to determine cross web direction positions of additional pels of the print image.

20. The computer readable medium of claim 19, having instructions stored thereon, which when executed by one or more processors, further cause the processors to generate a pel forming element map that maps the cross web direction positions of the locator marks and additional pels of the print image to corresponding pel forming elements based on the estimation model and the print instructions.

* * * * *